United States Patent
Fincke (10) Patent No.: US 6,332,111 B1
(45) Date of Patent: Dec. 18, 2001

(54) METHOD AND SYSTEM FOR MEASURING MULTIPHASE FLOW USING MULTIPLE PRESSURE DIFFERENTIALS

(75) Inventor: James R. Fincke, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/401,375

(22) Filed: Sep. 22, 1999

Related U.S. Application Data (63) Continuation-in-part of application No. 08/937,120, filed on Sep. 24, 1997, now abandoned.

(51) Int. Cl.[7] .................................................. G01F 1/74
(52) U.S. Cl. .......................... 702/50; 45/47; 73/861.63; 73/861.64
(58) Field of Search ........................ 73/861.04, 861.63, 73/861.64, 861.52; 702/50, 45, 66, 47

(56) References Cited

U.S. PATENT DOCUMENTS

| | | | | |
|---|---|---|---|---|
| 4,048,854 | * | 9/1977 | Herzl | 73/194 |
| 4,231,262 | * | 11/1980 | Boll et al. | 73/861.04 |
| 4,604,902 | * | 8/1986 | Sabin et al. | 73/861.04 |
| 5,099,697 | * | 3/1992 | Agar | 73/861.04 |
| 5,591,922 | * | 1/1997 | Segeral et al. | 73/861.04 |
| 5,869,771 | * | 2/1999 | Rajan et al. | 73/861.04 |

* cited by examiner

Primary Examiner—Kamini Shah
(74) Attorney, Agent, or Firm—Workman Nydegger & Seeley (57) ABSTRACT

An improved method and system for measuring a multiphase flow in a pressure flow meter. An extended throat venturi is used and pressure of the multiphase flow is measured at three or more positions in the venturi, which define two or more pressure differentials in the flow conduit. The differential pressures are then used to calculate the mass flow of the gas phase, the total mass flow, and the liquid phase. The method for determining the mass flow of the high void fraction fluid flow and the gas flow includes certain steps. The first step is calculating a gas density for the gas flow. The next two steps are finding a normalized gas mass flow rate through the venturi and computing a gas mass flow rate. The following step is estimating the gas velocity in the venturi tube throat. The next step is calculating the pressure drop experienced by the gas-phase due to work performed by the gas phase in accelerating the liquid phase between the upstream pressure measuring point and the pressure measuring point in the venturi throat. Another step is estimating the liquid velocity in the venturi throat using the calculated pressure drop experienced by the gas-phase due to work performed by the gas phase. Then the friction is computed between the liquid phase and a wall in the venturi tube. Finally, the total mass flow rate based on measured pressure in the venturi throat is calculated, and the mass flow rate of the liquid phase is calculated from the difference of the total mass flow rate and the gas mass flow rate.

48 Claims, 2 Drawing Sheets

METHOD AND SYSTEM FOR MEASURING MULTIPHASE FLOW USING MULTIPLE PRESSURE DIFFERENTIALS

RELATED APPLICATION

This application is a continuation-in-part application of U.S. patent application Ser. No. 08/937,120 filed Sep. 24, 1997 now abandonded.

CONTRACTUAL ORIGIN OF THE INVENTION

The U.S. Government has rights in this invention pursuant to Contract No. DE-AC07-94ID 13223 between the U.S. Department of Energy and Lockheed Martin Idaho Technologies Company.

BACKGROUND OF THE INVENTION

1. Field of the Invention

The present invention relates to a flow meter for measuring the flow of very high void fraction multi-phase fluid streams. More particularly, the present invention relates to an apparatus and method in which multiple pressure differentials are used to determine flow rates of gas and liquid phases of a predominantly gas fluid stream to thereby determine the mass flow rate of each phase.

2. State of the Art

There are many situations where it is desirable to monitor multi-phase fluid streams prior to separation. For example, in oil well or gas well management, it is important to know the relative quantities of gas and liquid in a multi-phase fluid stream, to thereby enable determination of the amount of gas, etc. actually obtained. This is of critical importance in situations, such as off-shore drilling, in which it is common for the production lines of several different companies to be tied into a common distribution line to carry the fuel back to shore. While a common method for metering a gas is to separate out the liquid phase, such a system in not desirable for fiscal reasons. When multiple production lines feed into a common distribution line, it is important to know the flow rates from each production line to thereby provide an accurate accounting for the production facilities.

In recent years, the metering of multi-phase fluid streams prior to separation has achieved increased attention. Significant progress has been made in the metering of multi-phase fluids by first homogenizing the flow in a mixer then metering the pseudo single phase fluid in a venturi in concert with a gamma densitometer or similar device. This approach relies on the successful creation of a homogenous mixture with equal phase velocities, which behaves as if it were a single phase fluid with mixture density $\bar{\rho}=\alpha\rho_g+(1-\alpha)\rho_1$ where $\alpha$ is the volume fraction of the gas phase, and $\rho_g$ is the gas phase density and $\rho_1$ is the liquid phase density. This technique works well for flows which after homogenizing the continuous phase is a liquid phase. While the upper limit of applicability of this approach is ill defined, it is generally agreed that for void fractions greater than about ninety to ninety-five percent (90–95%) a homogenous mixture is difficult to create or sustain. The characteristic undisturbed flow regime in this void fraction range is that of an annular or ring shaped flow configuration. The gas phase flows in the center of the channel and the liquid phase adheres to and travels along the sidewall of the conduit as a thick film. Depending on the relative flow rates of each phase, significant amounts of the denser phase may also become entrained in the gas phase and be conveyed as dispersed droplets. Nonetheless, a liquid film is always present on the wall of the conduit. While the liquid generally occupies less than five percent (5%) of the cross-sectional volume of the flow channel, the mass flow rate of the liquid may be comparable to or even several times greater than that of the gas phase due to its greater density.

The fact that the phases are partially or fully separated, and consequently have phase velocities which are significantly different (slip), complicates the metering problem. The presence of the liquid phase distorts the gas mass flow rate measurements and causes conventional meters, such as orifice plates or venturi meters, to overestimate the flow rate of the gas phase. For example the gas mass flow can be estimated using the standard equation $$m_g = \frac{AC_cY}{\sqrt{1-\beta^4}}\sqrt{2\rho_g\Delta P}$$

where $m_g$ is the gas mass flow rate, A is the area of the throat, $\Delta P$ is the measured pressure differential, $\rho_g$ the gas density at flow conditions, $C_c$ the discharge coefficient, and Y is the expansion factor. In test samples using void fractions ranging from 0.997 to 0.95, the error in the measured gas mass flow rate ranges from 7% to 30%. It is important to note that the presence of the liquid phase increases the pressure drop in the venturi and results in over-predicting the true gas mass flow rate. The pressure drop is caused by the interaction between the gas and liquid phases. Liquid droplet acceleration by the gas, irreversible drag force work done by the gas phase in accelerating the liquid film and wall losses determine the magnitude of the observed pressure drop. In addition, the flow is complicated by the continuous entrainment of liquid into the gas, the redeposition of liquid from the gas into the liquid film along the venturi length, and also by the presence of surface waves on the surface of the annular or ringed liquid phase film. The surface waves on the liquid create a roughened surface over which the gas must flow increasing the momentum loss due to the addition of drag at the liquid/gas interface.

Other simple solutions have been proposed to solve the overestimation of gas mass flow rate under multi-phase conditions. For example, Murdock, ignores any interaction (momentum exchange) between the gas and liquid phases and proposed to calculate the gas mass flow if the ratio of gas to liquid mass flow is known in advance. See Murdock, J. W. (1962). Two Phase Flow Measurement with Orifices, ASME Journal of Basic Engineering, December, 419–433. Unfortunately this method still has up to a 20% error rate or more.

While past attempts at metering multi-phase fluid streams have produced acceptable results below the ninety to ninety five percent (90–95%) void fraction range, they have not provided satisfactory metering for the very high void multi-phase flows which have less than five to ten (5–10%) non-gas phase by volume. When discussing large amounts of natural gas or other fuel, even a few percent difference in the amount of non-gas phase can mean substantial differences in the value of a production facility. For example, if there are two wells which produce equal amounts of natural gas per day. The first well produces, by volume, 1% liquid and the second well produces 5% liquid. If a conventional mass flow rate meter is relied upon to determine the amount of gas produced, the second well will erroneously appear to produce as much as 20–30% more gas than the first well. Suppose further that the liquid produced is a light hydrocarbon liquid (e.g. a gas condensate such as butane or propane) which is valuable in addition to the natural gas produced. Conventional meters will provide no information about the amount of liquid produced. Then if the amount of liquid produced is equally divided between the two wells, the value of the production from the first well will be overestimated while the production from the second well will be underestimated. To properly value the gas and liquid production from both wells, a method of more accurately determining the mass flow rate of both the gas and liquid phases is required.

The prior art, however, has been generally incapable of accurately metering the very high void multi-phase fluid streams. In light of the problems of the prior art, there is a need for an apparatus and method that is less complex and provides increased accuracy for very high void multi-phase fluid streams. Such an apparatus and method should be physically rugged, simple to use, and less expensive than current technology.

SUMMARY OF THE INVENTION

It is an object of the present invention to provide an improved apparatus and method for metering very high void multi-phase fluid streams.

It is another object of the present invention to provide an apparatus and method which increases the accuracy of metering with respect to both the gas phase and the liquid phase when measuring very high void multi-phase fluid streams.

It is still another object of the present invention to provide such an apparatus and method which does not require homogenization or separation of the multi-phase fluid in order to determine flow rate for each of the phases.

The above and other objects of the invention are realized in a specific method for metering the phases of a multiple phase fluid. The flow meter includes a cross-sectional area change in the flow conduit such as a venturi with an elongate passage. Disposed along the elongate passage is a converging section, an extended throat section, and a diffuser. The flow meter also includes a plurality of pressure monitoring sites which are used to monitor pressure changes which occur as the multi-phase fluid passes through the elongate passage. These pressure changes, in turn, can be processed to provide information as to the respective flow rates of the phases of the multi-phase fluid. By determining the flow rates of the components of the multi-phase fluid, the amount of natural gas, etc., can be accurately determined and accounting improved.

In accordance with another aspect of the present invention a method for determining the mass flow of the high void fraction fluid flow and the gas flow includes a number of steps. The first step is calculating a gas density for the gas flow. The next two steps are finding the normalized gas mass flow rate through the venturi and then computing the actual gas mass flow rate. The following step is estimating the gas velocity in the venturi tube throat. The next step is calculating the additional pressure drop experienced by the gas phase due to work performed by the gas phase in accelerating the liquid phase between the upstream pressure measuring point and the pressure measuring point at the end of the venturi contraction or throat. Yet another step is estimating the liquid velocity in the venturi throat using the calculated pressure drop experienced by the gas-phase due to work performed by the gas phase. Then, the friction loss is computed between the liquid phase and the conduit wall in the venturi tube using the liquid velocity. Finally, the total mass flow rate based on measured pressure in the venturi throat is calculated, and the liquid mass flow rate is calculated by subtracting the total mass flow rate and the gas mass flow rate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
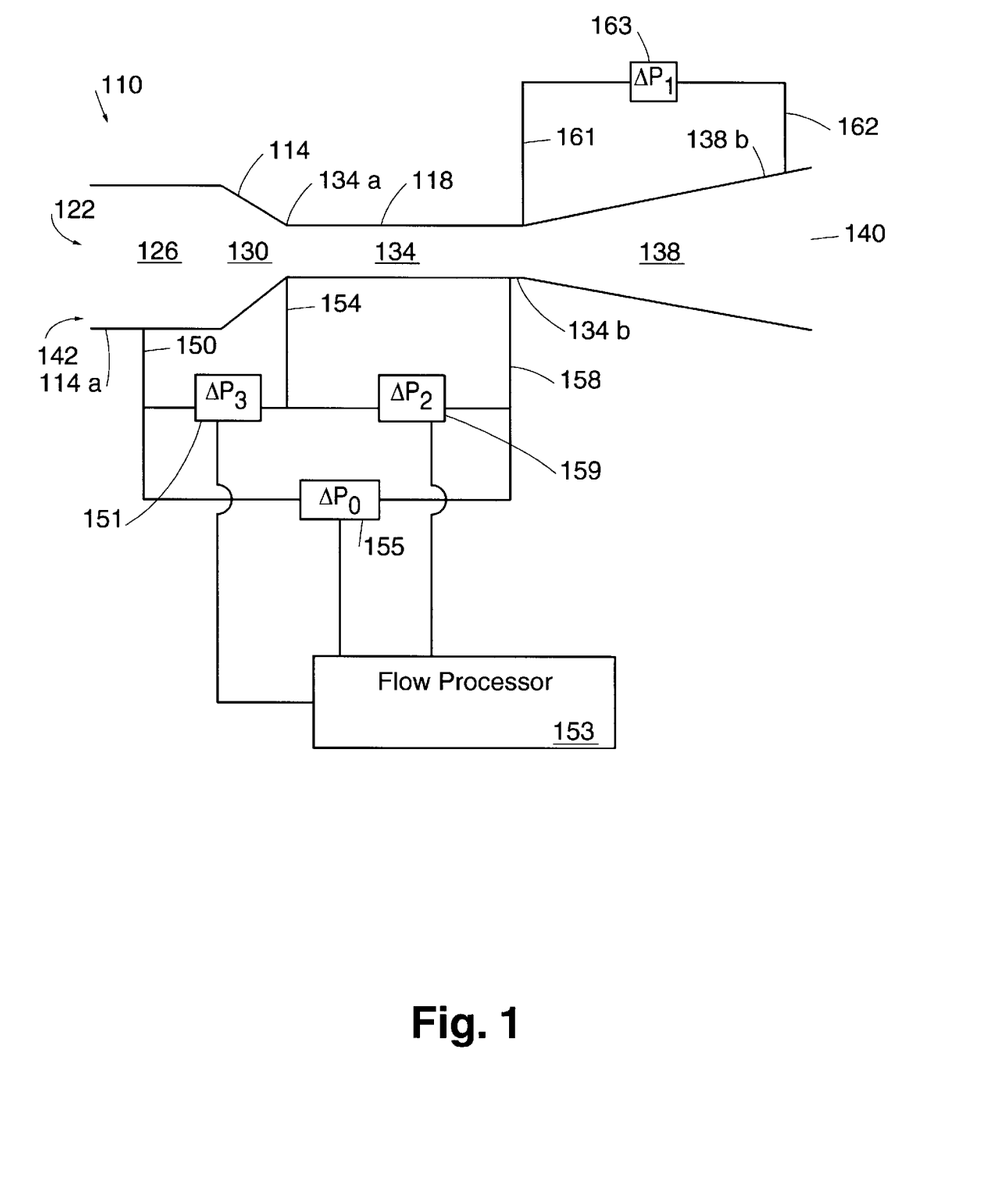
FIG. 1 shows a side, cross-sectional view of a differential pressure flow meter with pressure measuring ports.

Turning now to FIG. 1, there is shown another differential pressure flow meter, generally indicated at 110. The differential pressure flow meter 110 includes a venturi 114 formed by a sidewall 118 which defines a fluid flow passage 122. The fluid flow passage 122 is segmented into an inlet section 126, a converging section 130, an extended throat section 134, a diffuser section 138 and an outlet section 140. The geometry and conduit diameter of the flow obstruction will vary depending on the particular application. The conduit may be larger or smaller depending on the specific flow rate, pressure, temperature and other similar factors. One important characteristic of the flow meter is that the preferred contraction ratio in the conduit should be between 0.4 and 0.75. The contraction ratio is defined as the ratio of the throat diameter 134 to the upstream conduit diameter 122. It is also important that the length of the throat is at least ten times the diameter of the throat. Of course, other throat lengths may be used.

An example of one possible set of conduit measurements will now be given, but it should be realized that the actual geometry will depend on the volume and size of the specific application. In one embodiment of the invention, the inlet section 126 has a diameter of about 3.8 cm adjacent the opening 142 at the upstream, proximal end 114a of the venturi 114. The converging section 130 tapers inwardly from the inlet section 126 at an angle of about ten degrees (10°) until it connects with the extended throat section 134, which has a diameter of about 2.5 cm. The extended throat section 134 remains substantially the same diameter throughout its length and may be about 30 cm long to provide ample length to determine acceleration differences between the various phases. At the end of the extended throat section 134b, the diffuser section 138 tapers outwardly at an angle of about three degrees (3°) until the diameter of the outlet section passage 140 is substantially the same as that at the inlet section 126 (i.e. 3 cm). It should be realized that many other specific geometric configurations could be defined which have characteristics similar to the example above.

In order to monitor the pressure differentials caused by the changes in fluid velocity, the differential pressure flow meter shown in FIG. 1 utilizes up to four different measurement points. Each pair of pressure measurement points defines a pressure differential. Only two pressure differential measurements are required to determine the gas and liquid flow rates. The preferred pressure differentials are $\Delta P_3$ and $\Delta P_2$.

Pressure differential number three ($\Delta P_3$) is defined as the pressure change between points 150 and 154. Pressure differential number two ($\Delta P_2$) is between points 154 and 158. It should also be apparent based on this disclosure, that pressure differentials $\Delta P_3$ and $\Delta P_0$ or $\Delta P_2$ and $\Delta P_0$ may be used instead. Each of these combinations work equally well, with the exception that the numerical constants in the algorithm change. It is also important that an absolute pressure and temperature measurement will be provided at the venturi inlet 142.

Now the pressure ports will be described more specifically. A first pressure measuring port 150 is disposed to measure the pressure in the inlet section 142. The first pressure measuring port 150 is connected to a pressure monitoring means, such as a pressure transducer 151, to provide a pressure reading.

A second pressure measuring port 154 is provided at the entrance of the extended throat section 134. The second pressure measuring port 154 is disposed adjacent the upstream, proximal end 134a of the extended throat section 134. A pressure transducer 151 is also coupled to the second pressure measuring port 154.

Distally from the second pressure measuring port 154, but still within the extended throat section 134, is a third pressure monitoring port 158. Preferably, the third pressure monitoring port 158 is disposed adjacent the distal end 134b of the extended throat section 134, and adjacent the beginning 138a of the diffuser section 138.

The respective pressure measuring ports 150, 154, and 158 are disposed in communication with a flow processor 153 or similar mechanism through the pressure monitoring means or pressure transducers 151, 155, and 159. The flow processor 153 enables the acquisition of the measured pressure differentials, and thus fluid flow rates in accordance with the present invention. Further, an accurate determination of the relative acceleration of the two phases can also be obtained by comparing the pressure drop between the inlet section 126 (through measuring port 150) and the distal end 134b of the extended throat section 134 (through measuring port 158), as indicated at $\Delta P_0$ In an alternative embodiment of the invention, a fourth pressure measuring port 161 is disposed at the end of the extended throat 134b. A fifth pressure measuring port 162 is disposed in the outlet section 140 adjacent to the distal end 138b of the diffuser section 138. Both of these pressure measuring ports are coupled to pressure monitoring means or pressure transducer 163. The fourth and fifth monitoring ports allow a pressure differential $\Delta P_1$ to be measured. The pressure differential ($\Delta P_1$) between the extended throat section 134 and the distal end 138b of the diffuser section 138 can also be analyzed.

It should also be realized that different angles and lengths can be used for the venturi constriction and the extended throat of the venturi tube. In fact, the converging section of the venturi is not required to gradually taper. Rather the converging section can be formed by an annular shoulder to reduce the cross-sectional area of the inlet section. The preferred size of the radius of curvature for an annular shoulder is about 0.652 cm. The converging section can also be formed by placing a solid object in the conduit which occupies part but not all of the conduit cross-section.

It is vital that the correct method be used in the current invention to estimate the gas and fluid mass flow. Otherwise errors in the range of 20% or more will be introduced into the measurements, as in the prior art. Reliable metering of high void fraction multi-phase flows over a wide range of conditions (liquid loading, pressure, temperature, and gas and liquid composition) without prior knowledge of the liquid and gas mass flow rates requires a different approach than the simple modification of the single phase meter readings as done in the prior art. Conceptually, the method of metering a fluid flow described here is to impose an acceleration or pressure drop on the flow field via a structure or venturi constriction and then observe the pressure response of the device across two pressure differentials as described above. Because the multi-phase pressure response differs significantly from that of a single-phase fluid, the measured pressure differentials are a unique function of the mass flow rates of each phase.

As described above, the gas and liquid phases are strongly coupled. When the gas phase accelerates in the converging section of the nozzle, the denser liquid phase velocity appreciably lags that of the lighter gas phase. In the extended throat region, the liquid phase continues to accelerate, ultimately approaching its equilibrium velocity with respect to the gas phase. Even at equilibrium, significant velocity differences or slip will exist between the gas and liquid phases. A method for accurately calculating the gas and liquid mass flows in an extended venturi tube will now be described. (A derivation of the method is shown later.) This method uses the four values which are determined though testing. These values are: $\Delta P_3$ which is the measured pressure differential across the venturi contraction, $\Delta P_2$ which is the measured pressure differential across the extended venturi throat, P which is the absolute pressure upstream from the venturi (psi), and T which is the temperature of the upstream flow. These measured values are used with a number of predefined constants which will be defined as they are used. Alternatively, the pressure differentials $\Delta P_3$ and $\Delta P_0$, or the pressure differentials $\Delta P_0$ and $\Delta P_2$ may be used.

First, the gas density for the gas flow must be calculated based on the current gas well pressure and temperature. This is done using the following equation which uses English units. Any other consistent set of units may also be used with appropriate modifications to the equations.

$$rho_{gw} = rho_g \left(\frac{P+14.7}{14.7}\right)\left(\frac{60+459.67}{T+459.67}\right) \quad \text{Equation 1}$$

where $rho_g$ is the density of natural gas (i.e. a mixture methane and other hydrocarbon and non-hydrocarbon gases) at standard temperature (60° F.) and pressure (1 atmosphere) for a specific well;

P is the pressure upstream from the venturi in pounds per square inch (psi); and T is the temperature upstream from the venturi in degrees Fahrenheit.

The value of $rho_g$ will be different for various natural gas compositions and must be supplied by the well operator. At the standard temperature (60° F.) and pressure (1 atmosphere) the value of $rho_g$ for pure methane is 0.044 lb/ft$^3$.

The second step is finding a normalized gas mass flow rate based on the square root of a pressure difference across the contraction multiplied by a first predetermined coefficient, and the square root of a measured pressure differential across a venturi throat. The normalized gas mass flow rate is found using the following equation:

$$mgm = A + B\sqrt{\Delta P_3} + C\sqrt{\Delta P_2} \quad \text{Equation 2}$$

where

A, B, and C are experimentally determined constants required to calculate gas mass flow rate;

$\Delta P_3$ is the measured pressure differential across a venturi contraction; and $\Delta P_2$ is the measured pressure differential across a venturi throat. The preferred values for the constants in the equation above are as follows: A is $-0.0018104$, B is $0.008104$ and C is $-0.0026832$ when pressure is in pounds per square inch (psi), density in lbs/ft$^3$ and mass flow rate in thousands of mass lbs/minute. Of course, these numbers are determined experimentally and may change depending on the geometry of the venturi, the fluids used, and the system of units used.

Calculating the normalized gas mass flow rate is important because it allows the meter to be applied to the wells or situations where the pressure or meter diameter for the liquids present are different than the conditions under which the meter was originally calibrated. This means that the meter does not need to be calibrated under conditions identical to those present in a particular application and that the meter may be sized to match the production rate from a particular well.

The functional form of Equation 2 is arrived at by derivation from the conservation of mass and energy followed by a simplifying approximation. Other functional forms of Equation 2 can be used with equivalent results. The functional form of Equation 2 is consistent with the conservation laws and provides a good representation of the calibration data.

The third step is computing a gas mass flow rate using the normalized gas mass flow rate, the gas density, and a contraction ratio of the venturi tube. The equation for calculating the gas mass flow rate from these quantities is $$mg = mgm \cdot A_t \cdot \frac{\sqrt{rho_{gw}}}{\sqrt{1-\beta^4}} \qquad \text{Equation 3}$$

where mgm is the normalized gas mass flow rate;

$A_t$ is the venturi throat area;

$\beta$ is the contraction ratio of the throat area; and $rho_{gw}$ is the gas density at current well conditions.

The fourth step is estimating the gas velocity in the venturi tube throat. The equation for estimating the gas velocity is:

$$u_g = \frac{m_g}{rho_g \cdot A_t} \qquad \text{Equation 4}$$

where $m_g$ is the gas mass flow rate;

$rho_g$ is the density of the gas phase for a specific well; and $A_t$ is the venturi throat area.

The fifth step is calculating the pressure drop experienced by the gas phase due to work performed by the gas phase in accelerating the liquid phase between an upstream pressure measuring point and a pressure measuring point in the distal end of the venturi throat. The pressure drop is calculated as follows:

$$\Delta P_{gl3} = \Delta P_3 - \tfrac{1}{2} \cdot rho_{gw} \cdot u^2_g \cdot (1-\beta^4) \qquad \text{Equation 5}$$

where $\Delta P_3$ is the measured pressure differential across a venturi contraction;

$rho_{gw}$ is gas density at well conditions;

$u_g$ is the gas velocity in the venturi throat; and $\beta$ is the contraction ratio of the throat area to the upstream area.

It is important to note that the calculations outlined in steps two and five are important because they allow for estimating the mass flow of each phase.

Step six is estimating the liquid velocity ($u_l$) in the venturi throat using the calculated pressure drop experienced by the gas phase due to work performed by the gas phase. This is performed as follows $$u_l = \sqrt{\frac{2(\Delta P_3 - \Delta P_{gl3})}{rho_l \cdot [(1+\beta^4) + gcfw]}} \qquad \text{Equation 6}$$

where $\Delta P_3$ is the measured pressure differential across a venturi contraction;

$\Delta P_{gl3}$ is the pressure drop experienced by the gas-phase due to work performed by the gas phase on the liquid phase;

$rho_l$ is the liquid density; and gcfw is a constant which characterizes wall friction. The preferred value for gcfw is defined as 0.062. This value may be adjusted depending on different venturi geometries or different fluids.

The seventh step is computing the friction between the liquid phase and a wall in the venturi which is performed:

$$f = gcfw \cdot \tfrac{1}{2} \cdot rho_l \cdot u^2_l \qquad \text{Equation 7}$$

where gcfw is a constant which characterizes wall friction;

$rho_l$ is the liquid density; and $u_l$ is the liquid velocity in the venturi throat.

The eighth step is calculating the total mass flow rate based on the measured pressure in the venturi throat, the calculated friction and the gas velocity. The equation for this is:

$$m_t = \frac{2(\Delta P_3 - f)}{(1-\beta^4) \cdot u_g} \cdot A_t \qquad \text{Equation 8}$$

where $\Delta P_3$ is the measured pressure differential across a venturi contraction;

$\beta$ is the contraction ratio of the throat diameter to the upstream diameter; and $u_g$ is the gas velocity in the venturi throat.

The liquid mass flow rate can now be calculated as the difference between the total and gas mass flow rates.

$$m_l = (m_t - m_g) \qquad \text{Equation 9}$$

wherein $m_t$ is the total mass flow rate; and $m_g$ is the gas mass flow rate.

Calculating the gas mass flow rate, total mass flow rate, and liquid mass flow rate using the method outlined above is much more accurate than the prior art. The accuracy of method outlined above is within ±4% for the gas phase, ±5% for the liquid phase, and ±4% for the total mass flow. This accuracy can even be increased using measured calibrations for a specific installation to benchmark the readings.

Figure 2:
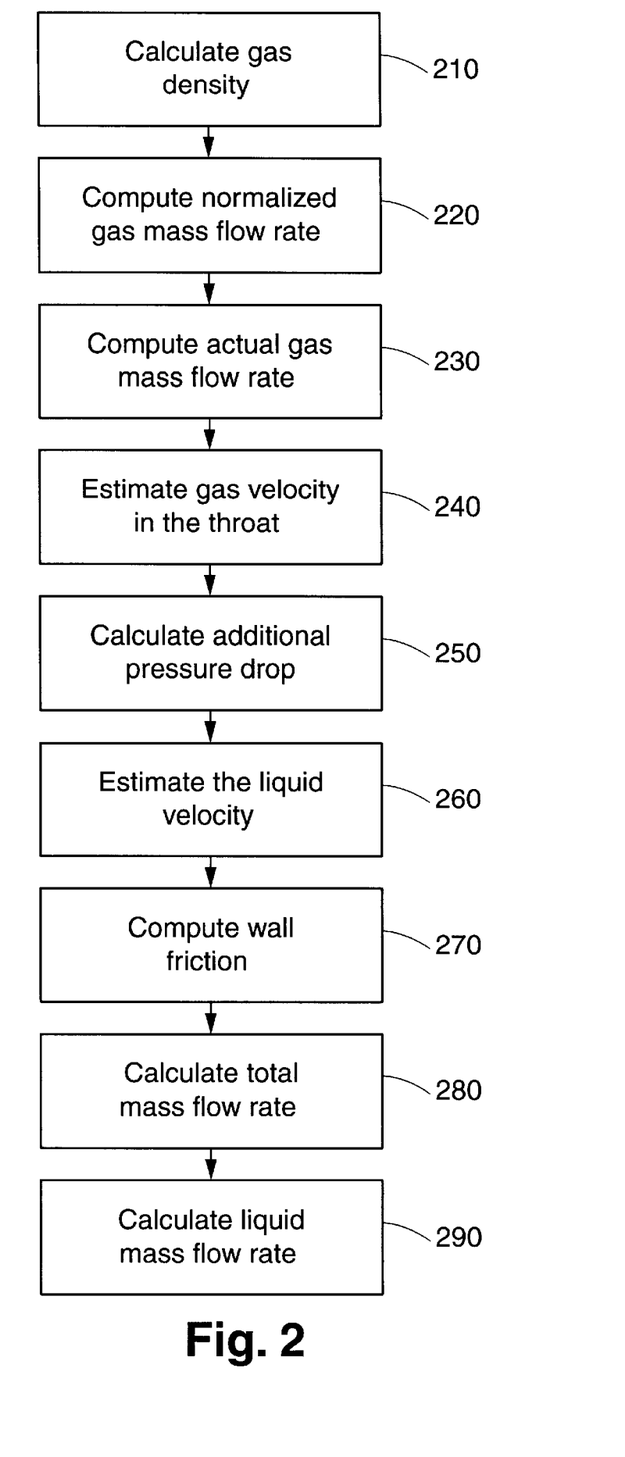
FIG. 2 is a flow chart showing the steps required to calculate the mass flow in a multiphase flow.

FIG. 2 shows a summary of the method used to accurately calculate the mass flow through the elongated venturi. The method for determining the mass flow of the high void fraction fluid flow and the gas flow includes steps which were described with Equations 1–9. Referring to FIG. 2, the first step is calculating a gas density for the gas flow 210. The next two steps are finding a normalized gas mass flow rate through the venturi 220 and computing a gas mass flow rate 230. The following step is estimating the gas velocity in the venturi tube throat 240. The next step is calculating the pressure drop experienced by the gas-phase due to work performed by the gas phase in accelerating the liquid phase between the upstream pressure measuring point and the pressure measuring point in the venturi throat 250. Yet another step is estimating the liquid velocity 260 in the venturi throat using the calculated pressure drop experienced by the gas-phase due to work performed by the gas phase. Then the friction is computed 270 between the liquid phase and a wall in the venturi tube. Finally, the total mass flow rate based on measured pressure in the venturi throat is calculated 280 and the liquid mass flow rate is determined 290.

Theoretical Gas Mass Flow Rate

Now a discussion of the theoretical derivations will be outlined which produced the method described above. The theoretical derivation is based on the physical laws describing the conservation of mass and energy for both the gas and liquid phases. The conservation of mass and energy equations for each phase are shown below where the subscript 1 denotes the upstream condition measured at 142 by pressure tap 150 in FIG. 1, and the subscript 2 denotes the venturi throat entrance measured at 134a by pressure tap 154. $\Delta P_{gl3}$ is the pressure drop experienced by the gas phase due to work done by the gas phase in accelerating the liquid phase between the pressure measuring location at the is beginning of the elongated throat and the pressure measuring location at the end of the throat. It is assumed that only the liquid phase is in contact with the wall, $f_w$ is the wall friction coefficient and $G_c$ is a geometry factor which accounts for the acceleration of the fluid in the venturi contraction and the surface area of the contraction.

$$m_g = \alpha_1 \rho_g u_{g1} A_1 = \alpha_2 \rho_g u_{g2} A_2$$

$$m_l = (1-\alpha_1) \rho_l u_{l1} A_1 = (1-\alpha_2) \rho_l u_{l2} A_2$$

$$P_1 + \tfrac{1}{2}\rho_g u^2_{g1} = P_2 + \tfrac{1}{2}\rho_g u^2_{g2} + \Delta P_{gl3}$$

$$P_1 + \tfrac{1}{2}\rho_l u^2_{l1} = P_2 + \tfrac{1}{2}\rho_l u^2_{l2} - \Delta P_{gl3} + G_c F_w \tfrac{1}{2}\rho_l u^2_{l2} \qquad \text{Equation 10}$$

In Equations 10, $\alpha$ is void fraction, $\rho_g$ is density of a gas at standard temperature, $u_g$ is the gas velocity, $A_1$ is the conduit area upstream of the venturi, $A_2$ is the conduit area in the venturi throat, and $P_1$ and $P_2$ are the pressures at locations 142 (tap 150) and 134a (tap 154) in the conduit.

The gas phase energy equation can be rewritten using the equation for the gas phase mass flow rate, where D is the diameter of the upstream piping, d is the throat diameter, $\beta = d/D$ is the contraction ratio, and $\Delta P_3 = P_2 - P_1$ is the pressure drop across the contraction.

$$\Delta P_3 = \frac{1}{2} \frac{m_g^2}{\rho_g \alpha_2^2 A_2^2} \left(1 - \left(\frac{\alpha_2}{\alpha_1}\right)^2 \beta^4\right) + \Delta P_{gl3} \qquad \text{Equation 11}$$

With the approximation that $\alpha_1$ and $\alpha_2 \approx 1$, the modified orifice equation results.

$$\Delta P_3 \approx \frac{1}{2} \frac{m_g^2}{\rho_g A^2}(1-\beta^4) + \Delta P_{gl3} \qquad \text{Equation 12}$$

For single-phase flow $\Delta P_{gl3}$ is equal to zero and the equation is solved directly for the mass flow rate $m_g$. In practice, the single-phase result is modified by the addition of an empirical constant $C_c$ which accounts for the true discharge characteristics (non-ideal one-dimensional behavior and friction losses) of the nozzle and Y which takes compressibility effects into account.

$$m_{gl\phi} = \frac{C_c A Y}{\sqrt{1-\beta^4}} \sqrt{2\rho_g \Delta P_3} \qquad \text{Equation 13}$$

As shown in the introduction, if the Equation 13 above is used under multiphase conditions, the mass flow rate of the gas phase can be significantly overestimated. Under multiphase conditions the mass flow rate of the gas phase is given by:

$$m_g = \frac{C_{2\phi} \alpha_2 A_2 Y}{\sqrt{1-(\alpha_2/\alpha_1)^2 \beta^4}} \sqrt{2\rho_g (\Delta P_3 - \Delta P_{gl3})} \qquad \text{Equation 14}$$

where $\alpha_2 A_2$ represents the cross sectional area occupied by the gas phase. When $\Delta P_3$ is large with respect to $\Delta P_{gl3}$ the quantity under the radical can be approximated by $$\sqrt{\Delta P_3 - \Delta P_{gl3}} \approx \sqrt{\Delta P_3} - C_{gl3} \times \sqrt{\Delta P_{gl3}} \qquad \text{Equation 15}$$

where $C_{gl3}$ is a constant that is determined experimentally. Empirically it has been found that $\Delta P_{gl3}$ can be replaced by a function of $\Delta P_2$, the pressure drop in the extended throat, with appropriate choice of constants. The mass flow rate of gas under both single phase and multiphase conditions now becomes $$m_g \frac{C_{2\phi} A Y}{\sqrt{1-\beta^4}} \sqrt{2\rho_g} \left[ \sqrt{\Delta P_3} - C_2 \times \sqrt{P_2} \right], \qquad \text{Equation 16}$$

where it has been assumed that $\alpha_2 \approx \alpha_1 \approx 1$. The constants $C_{2\phi}$ and $C_2$ have been determined empirically and the validity of the equation has been tested over a wide range of conditions. It is important to note that this method can be used not only with natural gas production but other gas and liquid phase compositions. In addition, it is also important to recognize that Equations 10–16 are used to derive calculation steps in the calculation method.

We have assumed that $\alpha_2 \approx \alpha_1 \approx 1$, making Equation 16 above only approximate. The statistical fitting procedure used to determine the constants $C_{2\phi}$ and $C_2$ implicitly determines a weighted mean value of $\alpha$. Because $\alpha$ does not appear explicitly and is unknown, there is an uncertainty of $\pm 1$–$2\%$ over the void fraction range $0.95 < \alpha < 1.0$, implicit in the equation. If $\alpha$ or $(1-\alpha)$ is independently measured, the observed measurement uncertainties can be significantly reduced. The uncertainty can also be significantly reduced if, at installation, the actual flow rates are accurately known. If this measurement is available then the meter reading can be adjusted to reflect the true value and the uncertainty in the gas phase mass flow rate measurement can be reduced to less than 0.5% of reading if the gas and liquid flow rates change by less than 50% or so over time. The repeatability of the measurement is essentially the random uncertainty in the pressure measurements, less than about 0.5% of reading.

Total and Liquid Mass Flow Rate

If the ratio of liquid to gas flow rate is known a priori with certainty then the mass flow rate of the liquid phase can be directly obtained from $m_l=m_g(m_l/m_g)_{known}$. Note that because the liquid mass flow rate is only a fraction (0–30%) of the gas mass flow rate the uncertainty in the measurement is magnified. For instance, if $m_l/m_g=0.01$, a 1% error in $m_g$ is magnified to become a 100% of reading error for the liquid phase. An additional fixed error of 1% in the ratio $m_l/m_g$ results in a 200% of reading total error for the liquid phase. This approach, of course, assumes that the $m_l/m_g$ ratio remains constant over time.

Unfortunately, without accurate independent knowledge of $\alpha$ or $(1-\alpha)$ the liquid mass flow rate cannot be obtained directly from one-dimensional theory. The velocity of the liquid phase can, however, be estimated directly as now described. Once the mass flow rate of the gas phase is determined the $\Delta P_{gl3}$ term can be estimated from the gas phase energy equation:

$$\Delta P_{gl3} \approx \Delta P_3 - \frac{1}{2}\frac{m_g^2}{\rho_g A^2}(1-\beta^4) \qquad \text{Equation 17}$$

Equation 17 allows us to derive Equation 5 in the calculation method. Rearranging the liquid phase energy equation yields $$\Delta P_3 + \Delta P_{gl3} = \frac{1}{2}\rho_l u_{l2}^2\left(1-\frac{u_{l1}^2}{u_{l2}^2}\right) + G_c f_w \frac{1}{2}\rho_l u_{l2}^2 \qquad \text{Equation 18}$$

and using the expression for the mass flow rate of liquid results in:

$$\Delta P_3 + \Delta P_{gl3} = \frac{1}{2}\rho_l u_{l2}^2\left(1-\frac{(1-\alpha_2)^2}{(1-\alpha_1)^2}\beta^4\right) + G_c f_w \frac{1}{2}\rho_l u_{l2}^2 \qquad \text{Equation 19}$$

With the assumption that $$\frac{(1-\alpha_2)^2}{(1-\alpha_1)^2}\beta^4 << 1$$

the liquid velocity $u_{l2}$ can be estimated. If $(1-\alpha)$ is known then the liquid mass flow rate could be estimated directly from $m_1=(1-\alpha_2)\rho u_{l2}A$. Unfortunately, $(1-\alpha)$ cannot be accurately estimated directly from the differential pressure data; it must be independently measured to pursue this approach.

If we consider the gas and liquid phases together but allow their velocities to differ, the total mass flow rate can be written as:

$$m_t = m_g + m_l = \left(\alpha\rho_g + \frac{(1-\alpha)}{S}\rho_l\right)u_g A \qquad \text{Equation 20}$$

where the density term in brackets is the effective density, $\rho_{slip}$ and $S=u_g/u_l$ which is ratio of the gas velocity to the liquid velocity or slip. Since $m_t$ is constant throughout the venturi, it allows us to write the pressure drop $\Delta P_3$ as $$\Delta P_3 = \frac{1}{2}\left(\alpha\rho_g + \frac{(1-\alpha)}{S}\rho_l\right)u_g^2(1-\beta^4) + G_c f_w \frac{1}{2}\rho_l u_{l2}^2 \qquad \text{Equation 21}$$

The second term on the right hand side is the friction loss assuming that only the liquid phase is in contact with the wall. The equation can be rearranged to yield the total mass flow rate $$m_t = \left(\alpha\rho_g + \frac{(1-\alpha)}{S}\rho_l\right)u_g A = \frac{2\left(\Delta P_3 - G_c f_w \frac{1}{2}\rho_l u_{l2}^2\right)A}{(1-\beta^4)\cdot u_g} \qquad \text{Equation 22}$$

The total mass flow rate $m_t$ can then be obtained directly from $\Delta P_3$ once $u_g$ is estimated from the measured value of $m_g$, $u_g=m_g/\rho_g A$ and the liquid velocity is calculated by solving equation 19 for $u_{l2}$. The total mass flow rate using this method is a measurement with an uncertainty of ±4% of the actual measured flow. In principle, (since the total mass flow rate is the sum of the gas and liquid mass flow rates) the liquid mass flow rate can now be obtained directly from $m_l=m_t-m_g$. The liquid mass flow rate can then be obtained within ±5% of the total mass flow rate.

As previously noted in the discussion of the measurement of the gas mass flow rate, if the flow rates of each phase are accurately known at the time of installation, measurement performance over a reasonable range of mass flow rates can be significantly enhanced. The uncertainty in the gas mass flow rate measurement can be reduced to <0.5% of reading by benchmarking even if the gas and/or liquid mass flow rates change by ±50%. Similarly, the uncertainty in the total mass flow rate can be reduced by <2% of reading for the same ±50% changes in gas and/or liquid mass flow rates. The corresponding improvement in accuracy of the liquid phase measurement is also significant. Because the liquid mass flow rate measurement is dependent on both the gas phase and total mass flow rate measurements, the uncertainty is also sensitive to changes in both gas and liquid mass flow rate. If the liquid mass flow rate measurement is benchmarked at an initial value, the data indicate that the accuracy attainable is ±20% of reading for changes in gas mass flow rate in the range of ≦±15% and/or changes in liquid mass flow rate in the range of ≦±25%. The uncertainty in the liquid mass flow rate quoted in terms of percent of total mass flow rate becomes ±1%.

Measurement uncertainties can be significantly reduced if flow rates are accurately known at time of meter installation or periodically measured by separation and separate metering during the service life of the meter and the well. Because the liquid phase is generally only a small fraction of the total mass flow rate the uncertainty in its measurement is inherently high. If the void fraction $\alpha$ is accurately and independently measured, the liquid mass flow rate can be calculated directly from $m_l=(1-\alpha)\,l_l u_{l2}A$ where the $u_{l2}$ the liquid velocity is obtained as described above from equation 19. The void fraction may be accurately and independently measured using a gamma ray attenuation densitometer or through ultrasonic film thickness measurements. This approach has been shown to significantly reduce the uncertainty in the liquid mass flow rate measurement.

I claim:

1. A method for finding a gas mass flow rate, and a total mass flow rate of a combined flow having a liquid phase and gas phase, using an extended throat venturi having a contraction and a throat, comprising the steps of:

(a) calculating a normalized gas mass flow rate based on measured pressure differences across the venturi contraction and throat;

(b) computing a gas mass flow rate in the throat using the normalized gas mass flow rate, venturi throat geometry, a gas density, and a contraction ratio of the venturi;

(c) estimating gas velocity in the throat using the gas mass flow rate;

(d) calculating a pressure drop experienced by the gas phase due to work performed by the gas phase in accelerating the liquid phase between an upstream pressure measuring point prior to the venturi and a pressure measuring point in the throat;

(e) estimating liquid velocity in the throat using the calculated pressure drop from step (d);

(f) computing a friction value between the liquid phase and venturi wall using the liquid velocity; and (g) calculating the total mass flow rate based on measured pressure difference in the throat, the friction value and the gas velocity.

2. A method for finding a gas mass flow rate, a total mass flow rate of a high void fraction flow having a liquid phase and gas phase, and a liquid mass flow rate, using an extended throat venturi having a contraction and a throat to determine a void fraction, comprising the steps of:

(a) calculating a gas density for a gas flow;

(b) calculating a normalized gas mass flow rate from a function of a square root of a first pressure difference across the contraction multiplied by a first predetermined coefficient, and the square root of a second pressure difference across the throat multiplied by a second predetermined coefficient;

(c) computing a gas mass flow rate in the throat using the normalized gas mass flow rate, a gas density, venturi throat geometry, and a contraction ratio of the venturi;

(d) estimating gas velocity in the throat using the gas mass flow rate;

(e) calculating a pressure drop experienced by the gas phase due to work performed by the gas phase in accelerating the liquid phase between an upstream pressure measuring point prior to the venturi and a pressure measuring point in the throat;

(f) estimating liquid velocity in the throat using the calculated pressure drop experienced by the gas phase due to work performed by the gas phase;

(g) computing a friction value between the liquid phase and a wall in the venturi using the liquid velocity;

(h) calculating the total mass flow rate based on a measured pressure difference in the throat, the friction value and the gas velocity; and (i) calculating a liquid mass flow rate as the difference between the total mass flow rate and the gas mass flow rate.

3. The method of claim 2 wherein the step of calculating a gas density for a gas flow further comprises the step of calculating the gas density for the gas flow using the equation:

$$rho_{gw} = rho_g \left( \frac{P + 14.7}{14.7} \right) \left( \frac{60 + 459.67}{T + 459.67} \right)$$

wherein
$rho_g$ is a methane density at standard temperature (60° F.) and pressure (1 atmosphere) for a specific well;
P is a pressure upstream from the venturi tube; and
T is a temperature upstream from the venturi tube.

4. The method of claim 2 wherein the step of finding a normalized gas mass (mgm) flow rate further comprises finding the normalized gas mass flow rate using the following equation:

$$mgm = A + B\sqrt{\Delta P_3} + C\sqrt{\Delta P_2}$$

where
A, B, and C are experimentally determined constants required to calculate gas mass flow rate;
$\Delta P_3$ is a measured pressure differential across the contraction; and
$\Delta P_2$ is a measured pressure differential across the throat.

5. The method of claim 3 wherein the constant A is −0.0018104, B is 0.008104 and C is −0.0026832 when pressure is in pounds per square inch (psi), mass flow rate is in thousands of mass lbs/minute, and density is in lbs/ft$^3$ and area is in inches$^2$.

6. The method of claim 2 wherein the step of computing a gas mass flow rate further comprises computing a gas mass flow rate (mg) using the following equation $$m_g = mgm \cdot A_t \cdot \frac{\sqrt{rho_{gw}}}{\sqrt{1 - \beta^4}}$$

wherein mgm is the normalized gas mass flow rate;
$A_t$ is an area of the venturi throat in inches; and
$\beta$ is a contraction ratio of the throat area to an upstream area.

7. The method of claim 2 wherein the step of estimating a gas velocity further comprises using the following equation:

$$u_g = \frac{m_g}{rho_g \cdot A_t}$$

wherein $m_g$ is the gas mass flow rate;
$rho_g$ is a gas density for a specific well; and
$A_t$ is an area of the venturi throat.

8. The method of claim 2 wherein the step of calculating a pressure drop experienced by a gas phase due to work performed by the gas phase further comprises using the following equation:

$$\Delta P_{g l 3} = \Delta P_3 - \tfrac{1}{2} \cdot rho_{gw} \cdot u_g^2 \cdot (1 - \beta^4)$$

wherein $\Delta P_3$ is a measured pressure differential across the contraction;
$rho_{gw}$ is gas density at well conditions;
$u_g$ is a gas velocity in the throat; and
$\beta$ is a contraction ratio of the throat area to an upstream area.

9. The method of claim 2 wherein the step of estimating liquid velocity in throat is performed using the following equation:

$$u_l = \sqrt{\frac{2(\Delta P_3 - \Delta P_{g l 3})}{rho_l \cdot [(1 + \beta^4) + gcfw]}}$$

wherein
$\Delta P_3$ is a measured pressure differential across a venturi contraction;
$\Delta P_{g l 3}$ is the pressure drop experienced by the gas-phase due to work performed by the gas phase on the liquid phase;
$rho_l$ is a liquid density; and
gcfw is a constant which characterizes wall friction.

10. The method as in claim 8 wherein the gcfw which represents wall friction is defined as 0.062.

11. The method as in claim 2 wherein the step of computing friction between the liquid phase and a wall in the venturi further comprises computing friction using the following equation:

$$f = gcfw \cdot \tfrac{1}{2} \cdot rho_l u^2{}_l$$

wherein gcfw is a constant which characterizes wall friction;

$rho_l$ is a liquid density; and $u_l$ is the liquid velocity in the venturi throat.

12. The method as in claim 2 wherein the step of calculating the total mass flow r at e further comprises calculating the total mass flow rate using the following equation:

$$m_t = \frac{2(\Delta P_3 - f)}{(1 - \beta^4) \cdot u_g} \cdot A_t$$

wherein $\Delta P_3$ is a measured pressure differential across contraction;

$\beta$ is a contraction ratio of the throat area to an upstream area; and $u_g$ is the gas velocity in the throat.

13. The method as in claim 2 wherein the step of calculating the total mass flow rate further comprises calculating the total mass flow rate using the following equation:

$$m_t = \frac{2(\Delta P_3 - f)}{(1 - \beta^4) \cdot u_g} \cdot A_t$$

wherein $\Delta P_3$ is a measured pressure differential across the contraction;

$\beta$ is a contraction ratio of the throat area to an upstream area; and $u_g$ is the gas velocity in the venturi throat.

14. The method as in claim 12 further comprising the step of calculating a liquid mass flow rate in millions of pounds per minute using the following equation:

$$m_l = (m_t - m_g)$$

wherein $m_t$ is the total mass flow rate; and $m_g$ is the gas mass flow rate.

15. A differential pressure flow meter for monitoring a mass flow rate of a gas and liquid multi-phase flow to measure flow rates of both the gas and liquid phases, comprising:

a venturi with an extended throat section disposed downstream from an inlet section, the extended throat portion having a throat inlet and an outlet;

pressure monitoring means disposed in communication with at least three locations along the venturi for monitoring at least two pressure differentials as the multi-phase flow passes through the venturi;

a flow processor coupled to the pressure monitoring means to calculate a gas mass flow rate by calculating a measured gas flow rate using the at least two pressure differentials.

16. The differential pressure flow meter as in claim 15 wherein the flow processor uses the measured gas flow rate in calculating a pressure drop experienced by a gas phase due to work performed by the gas phase in accelerating a liquid phase between an upstream pressure measuring point and a pressure measuring point in the extended throat section.

17. The differential pressure flow meter as in claim 16 wherein the flow processor uses the pressure drop calculated to further estimate liquid velocity and friction.

18. The differential pressure flow meter as in claim 17 wherein the flow processor calculates the total mass flow rate using the liquid velocity, friction, gas mass flow rate and at least two pressure differentials.

19. The differential pressure flow meter as in claim 17 wherein the flow processor calculates a liquid mass flow rate as a difference between the total mass flow rate and the gas mass flow rate.

20. A method for finding a gas mass flow rate in a combined flow having a liquid phase and gas phase, using an extended throat venturi having a contraction and a throat, comprising the steps of:

(a) calculating a normalized gas mass flow rate based on measured pressure differences across the venturi contraction and throat; and (b) computing a gas mass flow rate in the throat using the normalized gas mass flow rate, venturi throat geometry, a gas density, and a contraction ratio of the venturi.

21. The method of claim 20 wherein the step of calculating a normalized gas mass (mgm) flow rate further comprises finding the normalized gas mass flow rate using the following equation:

$$mgm = A + B\sqrt{\Delta P_3} + C\sqrt{\Delta P_2}$$

where

A, B, and C are experimentally determined constants required to calculate gas mass flow rate;

$\Delta P_3$ is a measured pressure differential across the contraction; and $\Delta P_2$ is a measured pressure differential across the throat.

22. The method of claim 20 wherein the step of computing a gas mass flow rate further comprises computing a gas mass flow rate (mg) using the following equation $$m_g = mgm \cdot A_t \cdot \frac{\sqrt{rho_{gw}}}{\sqrt{1 - \beta^4}}$$

wherein mgm is the normalized gas mass flow rate;

$A_t$ is an area of the venturi throat in inches; and $\beta$ is a contraction ratio of the throat area to an upstream area.

23. A method for finding a gas mass flow rate, and a liquid phase mass flow, of a combined flow having a liquid phase and gas phase, using an extended throat venturi having a contraction and a throat, comprising the steps of:

(a) calculating a normalized gas mass flow rate based on measured pressure differences across the venturi contraction and throat;

(b) computing a gas mass flow rate in the throat using the normalized gas mass flow rate, venturi throat geometry, a gas density, and a contraction ratio of the venturi;

(c) estimating gas velocity in the throat using the gas mass flow rate;

(d) calculating a pressure drop experienced by the gas phase due to work performed by the gas phase in accelerating the liquid phase between an upstream pressure measuring point prior to the venturi and a pressure measuring point in the throat;

(e) estimating liquid velocity in the throat using the calculated pressure drop from step (d);

(f) measuring the void fraction in the throat using a measurement device; and (g) calculating the liquid mass flow rate directly from one minus the void fraction multiplied by the liquid density, the liquid velocity, and the throat area.

24. The method for finding a gas and liquid mass flow rates as in claim 23 wherein step (f) further comprises the step of measuring the void fraction in the throat using a gamma ray attenuation densitometer.

25. The method for finding a gas and liquid mass flow rates as in claim 23 wherein step (f) further comprises the step of measuring the void fraction in the throat using an ultrasonic film thickness measuring device.

26. The method for finding a gas and liquid mass flow rate as in claim 23 wherein step (f) further comprises the step of measuring the void fraction in the throat using a microwave attenuation densitometer or microwave resonant cavity densitometer.

27. The method for finding a gas and liquid mass flow rate as recited in claim 23, wherein a measured void fraction is greater than about ninety percent.

28. The differential pressure flow meter as recited in claim 15, wherein said extended throat section has a length-to-diameter ratio of at least about ten.

29. A fuel production and monitoring system, comprising:
(a) at least one well; and
(b) a differential pressure flow meter for monitoring a mass flow rate of a gas and liquid multi-phase flow from said at least one well, said differential flow meter using said mass flow rate of said gas and liquid multi-phase flow to measure flow rates of gas and liquid phases of said gas and liquid multi-phase flow, and comprising:
  (i) a venturi with an extended throat section disposed downstream from an inlet section, said extended throat portion having a throat inlet and an outlet;
  (ii) a pressure monitoring means disposed in communication with at least three locations along said venturi for monitoring at least two pressure differentials as said gas and liquid multi-phase flow passes through said venturi; and
  (iii) a flow processor coupled to said pressure monitoring means to calculate a gas mass flow rate by calculating a measured gas flow using said at least two pressure differentials.

30. The fuel production and monitoring system as recited in claim 29, wherein said gas and liquid multi-phase flow includes methane.

31. The fuel production and monitoring system as recited in claim 29, wherein said liquid phase comprises a light hydrocarbon.

32. The fuel production and monitoring system as recited in claim 31, wherein said light hydrocarbon is selected from the group consisting of: butane and propane.

33. The fuel production and monitoring system as recited in claim 29, wherein said gas and liquid multi-phase flow has a void fraction greater than about ninety percent.

34. The fuel production and monitoring system as recited in claim 29, wherein said gas phase comprises natural gas.

35. The fuel production and monitoring system as recited in claim 29, wherein said extended throat section has a length-to-diameter ratio of at least about ten.

36. The fuel production and monitoring system as recited in claim 29, wherein said pressure monitoring means comprises a pressure transducer.

37. The fuel production and monitoring system as recited in claim 29, further comprising a gamma ray attenuation densitometer.

38. The fuel production and monitoring system as recited in claim 29, wherein said gas and liquid multi-phase flow is substantially non-homogeneous.

39. The fuel production and monitoring system as recited in claim 29, wherein said at least one well comprises an oil well.

40. The fuel production and monitoring system as recited in claim 29, wherein said at least one well comprises a gas well.

41. In an oil field including a plurality of wells, an oil field management system for facilitating substantially real-time management of at least one of the plurality of wells, comprising:
(a) at least one differential pressure flow meter for monitoring a mass flow rate of a gas and liquid multi-phase flow from at least one of the plurality of wells, said at least one differential flow meter using said mass flow rate of said gas and liquid multi-phase flow to measure flow rates of gas and liquid phases of said gas and liquid multi-phase flow, and comprising:
  (i) a venturi with an extended throat section disposed downstream from an inlet section, said extended throat portion having a throat inlet and an outlet;
  (ii) a pressure monitoring means disposed in communication with at least three locations along said venturi for monitoring at least two pressure differentials as said gas and liquid multi-phase flow passes through said venturi; and
  (iii) a flow processor coupled to said pressure monitoring means to calculate a gas mass flow rate by calculating a measured gas flow using said at least two pressure differentials; and
(b) a well control system in operative communication with at least one of the plurality of wells and with said at least one differential pressure flow meter so that when a gas mass flow rate is calculated that falls within a range of predetermined values, said well control system causes at least one corresponding action.

42. The oil field management system of claim 41, wherein said at least one corresponding action comprises generating a warning signal.

43. The oil field management system of claim 41, wherein said at least one corresponding action comprises substantially stopping flow of said gas and liquid multi-phase flow from at least one of the plurality of wells.

44. The oil field management system of claim 41, wherein said at least one corresponding action comprises adjusting flow of said gas and liquid multi-phase flow from at least one of the plurality of wells.

45. A system for separating and measuring gas and liquid phases of a gas and liquid multi-phase flow, the system comprising:
(a) a separator including a gas phase outlet through which the gas and liquid multi-phase flow passes; and
(b) a differential pressure flow meter for monitoring mass flow rates of the gas and liquid multi-phase flow at said gas phase outlet, said differential flow meter using said mass flow rate of said gas and liquid multi-phase flow to measure flow rates of gas and liquid phases of the gas and liquid multi-phase flow, and comprising:
  (i) a venturi with an extended throat section disposed downstream from an inlet section, said extended throat portion having a throat inlet and an outlet;
  (ii) a pressure monitoring means disposed in communication with at least three locations along said venturi for monitoring at least two pressure differentials as said gas and liquid multi-phase flow passes through said venturi; and (iii) a flow processor coupled to said pressure monitoring means to calculate a gas mass flow rate by calculating a measured gas flow using said at least two pressure differentials.

46. The system as recited in claim 45, wherein at least said separator is installed in a subsea location.

47. The system as recited in claim 45, wherein said gas and liquid multi-phase flow is substantially non-homogeneous.

48. The system as recited in claim 45, wherein said extended throat section has a length-to-diameter ratio of at least about ten.

\* \* \* \* \*